United States Patent
Wang et al.

(10) Patent No.: US 9,888,185 B1
(45) Date of Patent: Feb. 6, 2018

(54) ROW DECODER FOR HIGH DYNAMIC RANGE IMAGE SENSOR USING IN-FRAME MULTI-BIT EXPOSURE CONTROL

(71) Applicant: OMNIVISION TECHNOLOGIES, INC., Santa Clara, CA (US)

(72) Inventors: Rui Wang, San Jose, CA (US); Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/384,866

(22) Filed: Dec. 20, 2016

(51) Int. Cl.
H04N 5/235 (2006.01)
H04N 5/355 (2011.01)

(52) U.S. Cl.
CPC ........... *H04N 5/2352* (2013.01); *H04N 5/355* (2013.01)

(58) Field of Classification Search
CPC .... H04N 5/3575; H04N 5/378; H04N 5/2352; H04N 5/2257; H04N 5/355
See application file for complete search history.

(56) References Cited

U.S. PATENT DOCUMENTS

| | | | |
|---|---|---|---|
| 6,920,078 B2 * | 7/2005 | Cho | H04N 3/1512 348/E3.018 |
| 6,999,374 B2 | 2/2006 | Cho | |
| 7,190,397 B2 | 3/2007 | Andersson | |
| 8,072,518 B2 * | 12/2011 | Araki | H04N 5/335 348/294 |
| 8,093,541 B2 | 1/2012 | Chen | |
| 8,742,311 B2 * | 6/2014 | Manabe | H01L 27/14612 250/208.1 |
| 8,896,743 B2 | 11/2014 | Du et al. | |
| 9,118,851 B2 * | 8/2015 | Dai | H04N 5/37457 |
| 2008/0239111 A1 * | 10/2008 | Jiang | H04N 5/361 348/243 |
| 2009/0256060 A1 * | 10/2009 | Meynants | H04N 5/353 250/208.1 |
| 2014/0252208 A1 * | 9/2014 | Fujinaka | H04N 5/363 250/208.1 |
| 2015/0237274 A1 * | 8/2015 | Yang | H04N 5/3575 348/308 |

OTHER PUBLICATIONS

U.S. Appl. No. 15/384,859, filed Dec. 20, 2016, Dai et al.
U.S. Appl. No. 15/384,872, filed Dec. 20, 2016, Wang et al.

* cited by examiner

*Primary Examiner* — Amy Hsu
(74) *Attorney, Agent, or Firm* — Christensen O'Connor Johnson Kindness PLLC

(57) ABSTRACT

A pixel circuit includes a transfer transistor coupled between a photodiode and a floating diffusion to transfer image charge to the floating diffusion. A precharge offset signal is representative of a difference between a row that includes the transfer transistor and a different row that is being read out. The selection circuit is coupled to select between first and second transfer control signals to control the transfer transistor. The selection circuit is coupled to output the first transfer control signal in response to a precharge enable signal during a read out operation of the different row. The precharge enable signal is generated in response to a comparison of a precharge offset signal and an exposure value signal. The selection circuit is coupled to output the second transfer control signal in response to a sample enable signal during a read out operation of the row that includes the transfer transistor.

34 Claims, 8 Drawing Sheets

ROW DECODER FOR HIGH DYNAMIC RANGE IMAGE SENSOR USING IN-FRAME MULTI-BIT EXPOSURE CONTROL

BACKGROUND INFORMATION

Field of the Disclosure

The present invention is generally related to image sensors, and more specifically, the present invention is directed to high dynamic range image sensors.

Background

An image capture device includes an image sensor and an imaging lens. The imaging lens focuses light onto the image sensor to form an image, and the image sensor converts the light into electric signals. The electric signals are output from the image capture device to other components of a host electronic system. The electronic system may be, for example, a mobile phone, a computer, a digital camera or a medical device.

The demands on the image sensor to perform over a large range of lighting conditions, varying from low light conditions to bright light conditions are becoming more difficult to achieve as pixel circuits become smaller. This performance capability is generally referred to as having high dynamic range imaging (HDRI or alternatively just HDR). High dynamic range imaging is a very desirable feature for a number of applications such as for example automotive and machine vision. In conventional image capture devices, pixel circuits require multiple successive exposures such that the image sensor is exposed to both low and high light levels to achieve HDR. Traditional complementary metal oxide semiconductor (CMOS) image sensors suffer from low dynamic range due to limited well-capacity and fixed exposure times.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
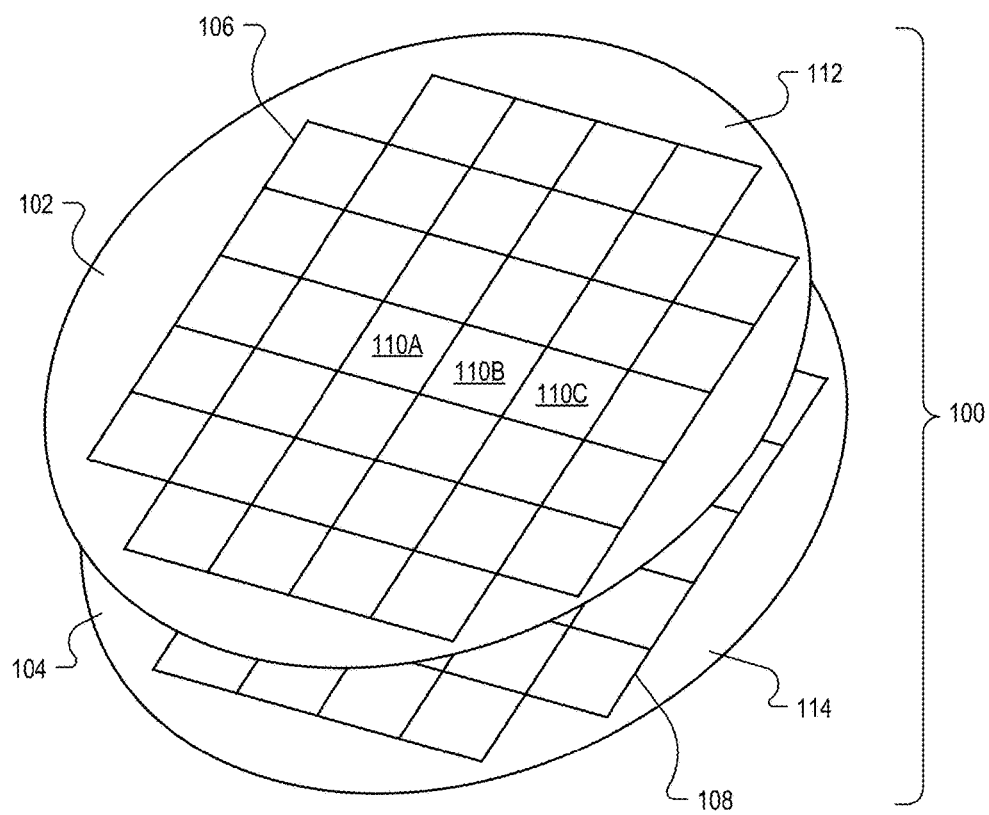
FIG. 1 is an exploded view of one example of stacked semiconductor device wafers with integrated circuit dies of an example imaging system including control circuitry with row decoder and select circuits for use with a high dynamic range image sensor read out architecture using in-frame multi-bit exposure control in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, examples in accordance with the teaching of the present invention describe an image sensor pixel circuit for use in a high dynamic range (HDR) image sensor, including control circuitry with row decoder circuitry for controlling exposure and reading out HDR image data from each pixel circuit. As will be shown, the row decoder circuitry used in a highly-programmable and high-efficiency exposure control and read out architecture is provided that encodes precharge offset signals to improve the dynamic range performance with pixel hybrid bond technology. In various examples, the pixel arrays are disposed in a separate wafer from peripheral circuits, and two wafers are bonded together with pixel level bonding. There is a memory to store the exposure information for each pixel circuit, or each block of pixel circuits, right underneath the pixel circuits or blocks of pixel circuits. In various examples, in-frame programmable exposure control of each individual pixel circuit across the pixel array is provided with multi-bit resolution, which achieves optimal operation of each pixel circuit across the pixel array. Compared to known HDR imaging solutions, examples in accordance with the teachings of the present invention can achieve individual in-frame exposure control for each individual pixel circuit using the encoded precharge offset signals, which lead to improved charge integration across the pixel array. Such exposure control and read out techniques using the encoded precharge offset signals in accordance with the teaching of the present invention reduce the number of wires and associated metal routings to eliminate the need for multi-frame combinations or down-sampling of pixel circuit rows during read out, which lead to high frame rate and high spatial resolution in accordance with the teachings of the present invention.

To illustrate, FIG. 1 is an exploded view of one example of stacked semiconductor device wafers 102 and 104 with integrated circuit dies of an example imaging system 100 including control circuitry with row decoder and select circuits for use with a high dynamic range image sensor read out architecture using in-frame multi-bit exposure control in accordance with the teachings of the present invention. In various examples, semiconductor device wafers 102 and 104 may include silicon, or other suitable semiconductor materials. In the illustrated example, device wafer 102 is a top sensor chip that includes a pixel array 106 having a pixel circuits 110A, 110B, 110C, etc., disposed in a first semiconductor layer 112. Device wafer 102 is stacked with device wafer 104, which includes corresponding support circuitry 108 disposed in a second semiconductor layer 114 and coupled to pixel array 106 through pixel level hybrid bonds to support operation of the photon detection array 106 in accordance with the teachings of the present invention.

As will be discussed in more detail below, in some examples, the pixel circuits 110 in first semiconductor layer 112 include photodiodes that are coupled to floating diffusions through transfer transistors, the corresponding support circuitry 108 included in the second semiconductor layer 114 include control circuitry with row decoder and select circuits that are coupled to output first transfer control signals coupled to transfer transistors in response to precharge enable signals during read out operations of different rows that do not include transfer transistors, while the select circuits are coupled to output second transfer control signals in response to a sample enable signals to transfer transistors during read out operations of the same rows that include the transfer transistors in accordance with the teachings of the present invention. In the various examples, the select circuits included in support circuitry 108 are coupled to receive encoded precharge offset signals and may include an exposure memory so that each individual pixel may have a multi-bit (e.g., 4-bits) exposure value stored in it. This exposure memory may be interconnected through the pixel level hybrid bonds to the pixel circuits disposed in the first semiconductor layer. The exposure memory may be implemented a static random access memory, or other suitable type of memory. In addition, in various examples, the exposure memory may also be shared among a block of pixel circuits, such as for example of block of 8×8 pixel circuits. Furthermore, in various examples, the since the precharge signals have been encoded into precharge offset signals, the number of necessary wires is significantly reduced, such as for example from 11 to 4 wires, the metal number of metal routings is reduced in accordance with the teachings of the present invention.

It is noted that the example image sensing system 100 shown in FIG. 1 is illustrated with two stacked semiconductor device wafers 102 and 104 for explanation purposes. In other examples, it is appreciated that the image sensing system 100 may include more than two stacked semiconductor device wafers for additional functions, features, and improved performance in accordance with the teachings of the present invention.

Figure 2:
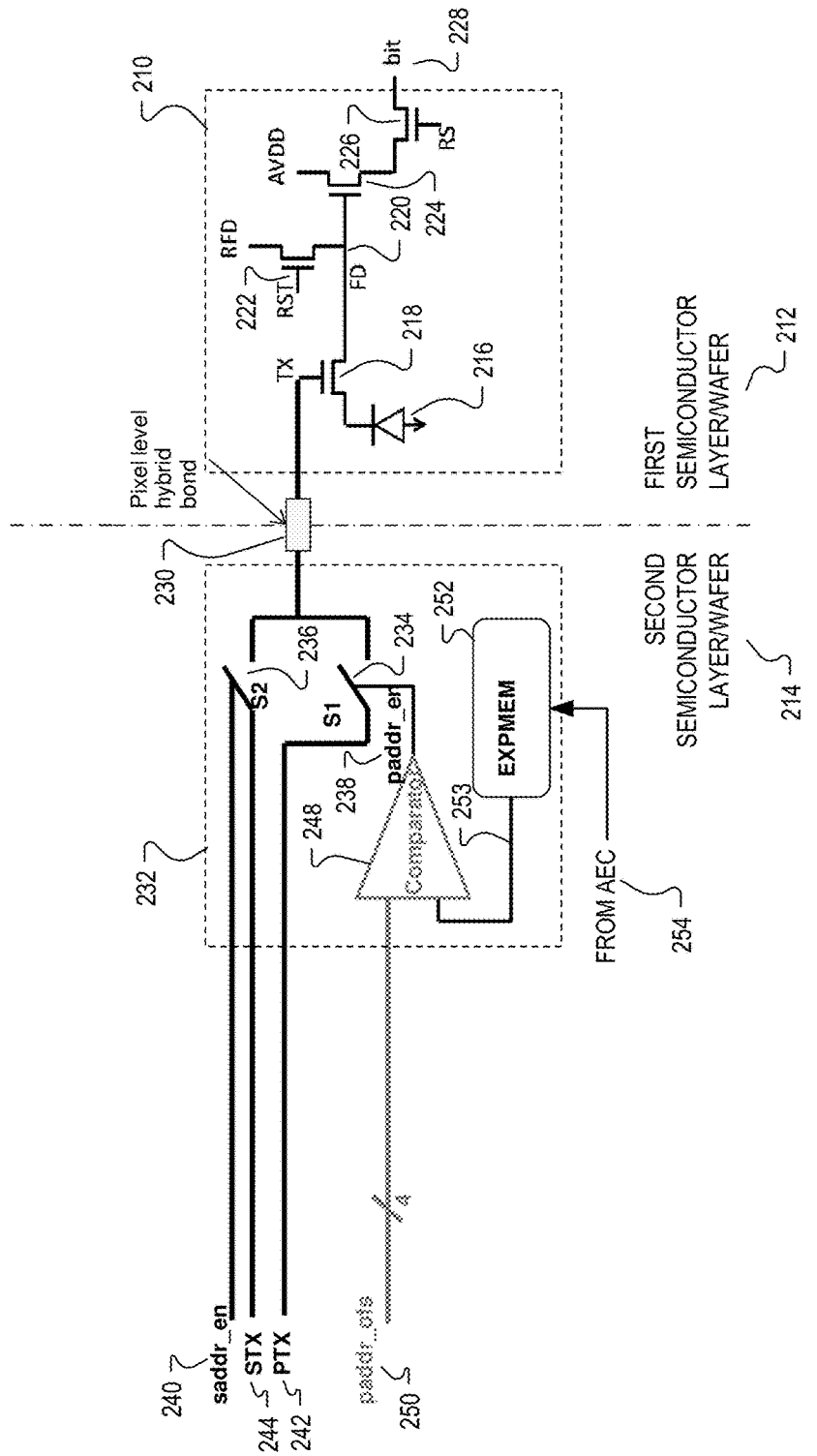
FIG. 2 is a circuit diagram showing an example of a portion of the circuitry of a pixel circuit coupled to receive signals from a row decoder for use with a high dynamic range read out architecture using in-frame multi-bit exposure in accordance with the teachings of the present invention.

FIG. 2 is a circuit diagram showing an example of a portion of the circuitry of a pixel circuit 210 and associated support circuitry coupled to receive signals from a row decoder for use with a high dynamic range read out architecture using in-frame multi-bit exposure in accordance with the teachings of the present invention. It is noted that pixel circuit 210 may be an example of one of the pixel circuits 110A, 110B, 110C of pixel array 106 of FIG. 1, and that similarly named and numbered elements referenced below are coupled and function similar to as described above. As shown in the depicted example, pixel circuit 210 is disposed in a first semiconductor layer 212. Pixel circuit 210 includes a photodiode 216 disposed in a first semiconductor layer 212 adapted to accumulate image charge in response to incident light. A transfer transistor 218 disposed in the first semiconductor layer 212 is coupled between the photodiode 216 and a floating diffusion 220 disposed in the first semiconductor layer 212 to selectively transfer the image charge accumulated in the photodiode 216 to the floating diffusion 220.

Continuing with the illustrated example, a reset transistor 222 is disposed in the first semiconductor layer 212 and coupled to the floating diffusion 220 to selectively reset the floating diffusion 220 in response to a reset RST signal. In the example, the reset transistor is coupled between a reset floating diffusion RFD voltage and the floating diffusion 220. An amplifier transistor 224 is disposed in the first semiconductor layer 212 and includes an amplifier gate terminal coupled to the floating diffusion 220. In the example, the amplifier transistor 224 is a source-follower coupled transistor, and has a drain terminal coupled to an AVDD voltage and a source terminal coupled to provide the amplified output of amplifier transistor 224. A row select transistor 226 is disposed in the first semiconductor layer 212 and is coupled between a bitline 228 and the amplifier transistor 224. In operation, the row select transistor 226 is coupled to output the image data of pixel circuit 210 in response to a row select signal RS.

A select circuit 232 is disposed in a second semiconductor layer 214 and is coupled to a control terminal of the transfer transistor 218 through a pixel level hybrid bond 230 between the first semiconductor layer 212 and second semiconductor layer 214 to select between a first transfer signal PTX 242 and a second transfer control signal STX 244 to control the transfer transistor 218 in accordance with the teachings of the present invention. As will be discussed in further detail below, the select circuit 232 may be one of a plurality of select circuits that coupled to corresponding pixel circuits 210 of a pixel array in accordance with the teachings of the present invention. In the example depicted in FIG. 2, select circuit 232 is coupled to output the first transfer control signal PTX 242 in response to a precharge enable signal paddr_en 238 during a read out operation of a different row than a row of the pixel array in which the transfer transistor 218 is included. The select circuit 232 is also coupled to output the second transfer control signal STX 244 in response to a sample enable signal saddr_en 240 during a read out operation of a pixel circuit in the same row of the pixel array in which the transfer transistor 218 is included. Accordingly, the first transfer control signal PTX 242 can be used to independently precharge the pixel circuit 210 to control the exposure of pixel circuit 210, while a different row is of the pixel array is being read out with the second transfer control signal STX 244 in accordance with the teachings of the present invention. Therefore, individual in-frame exposure control for each individual pixel circuit 210 is realized, which leads to improved charge integration across the entire pixel array to provide high dynamic range image sensing in accordance with the teachings of the present invention.

As shown in the example depicted in FIG. 2, select circuit 232 includes a first switch S1 234 coupled to generate the first transfer control signal PTX 242 in response to the precharge enable signal paddr_en 238, and a second switch S2 236 coupled to generate the second transfer control signal STX 244 in response to the sample enable signal saddr_en 240.

A comparator circuit 248 is coupled to generate the precharge enable signal paddr_en 238 in response to a comparison of precharge offset signal 250 and an exposure value signal 253. As will be discussed in greater detail below, in one example, precharge offset signal 250 is coupled to be received from a row decoder circuit, and is representative of a difference between the current row that includes the transfer transistor 218 for precharging and a different row of the pixel array that is currently being read out. In the example, the exposure value signal 253 is stored in an exposure memory EXPMEM 252. In one example, the exposure value represented by exposure value signal 253 stored in exposure memory EXPMEM 252 is a multi-bit (e.g., 4-bit) value received from an automatic exposure control (AEC) circuit 254. As will be discussed in greater detail below, in one example, the exposure value stored in exposure memory EXPMEM 252 is used to adjust the exposure of the image data generated by pixel circuit 210. In the example, the exposure value stored in exposure memory EXPMEM 252 represents one of the different possible exposure values for the exposure value signal. In one example, the exposure value stored in exposure memory EXPMEM 252 may be shared by a block of pixels to adjust the exposure of the image data generated by the block of pixels in a pixel array including pixel circuit 210, such as for example an 8×8 block of neighboring pixels.

Figure 3:
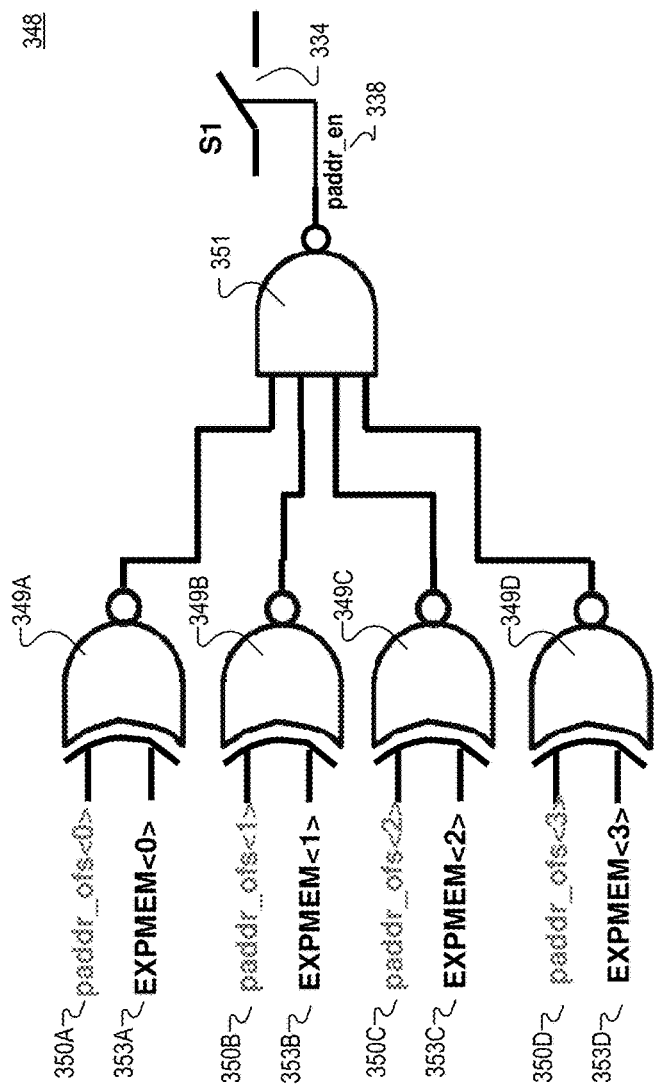
FIG. 3 is a circuit diagram showing one example of a comparator that may be included the circuitry of a pixel circuit coupled to receive signals from a row decoder for use with a high dynamic range read out architecture using in-frame multi-bit exposure in accordance with the teachings of the present invention.

FIG. 3 is a circuit diagram showing one example of a comparator 348 that may be included the circuitry of a pixel circuit coupled to receive signals from a row decoder for use with a high dynamic range read out architecture using in-frame multi-bit exposure in accordance with the teachings of the present invention. It is noted that comparator 348 may be an example of one of comparator 248 of FIG. 2, and that similarly named and numbered elements referenced below are coupled and function similar to as described above. As shown in the depicted example, comparator 348 includes a plurality of exclusive-OR (XOR) gates 349A, 349B, 349C, and 349D. In the example, each one of the plurality of XOR gates 349A, 349B, 349C, and 349D is coupled to receive a corresponding bit paddr_ofs<0> 350A, paddr_ofs<1> 350B, paddr_ofs<2> 350C, or paddr_ofs<3> 350D, of the precharge offset signal, and a corresponding bit EXPMEM<0> 353A, EXPMEM<1> 353B, EXPMEM<2> 353C, or EXPMEM<3> 353D, of the exposure value signal. A NAND gate 351 is coupled to outputs of the plurality of XOR gates 349A, 349B, 349C, and 349D, and an output of the NAND gate 351 is coupled to generate the precharge enable signal paddr_en 338, which is coupled to control the first switch S1 334 as illustrated.

It is noted that the example depicted in FIG. 3 is illustrated with the precharge offset signal (paddr_ofs) and exposure value signal (EXPMEM) having 4-bits. As such, there are four XOR gates 349A, 349B, 349C, and 349D. It appreciated that the 4-bit example illustrated herewith is provided for explanation purposes, and that in other examples, the number of bits for the precharge offset and exposure value signals may be different than 4.

Figure 4:
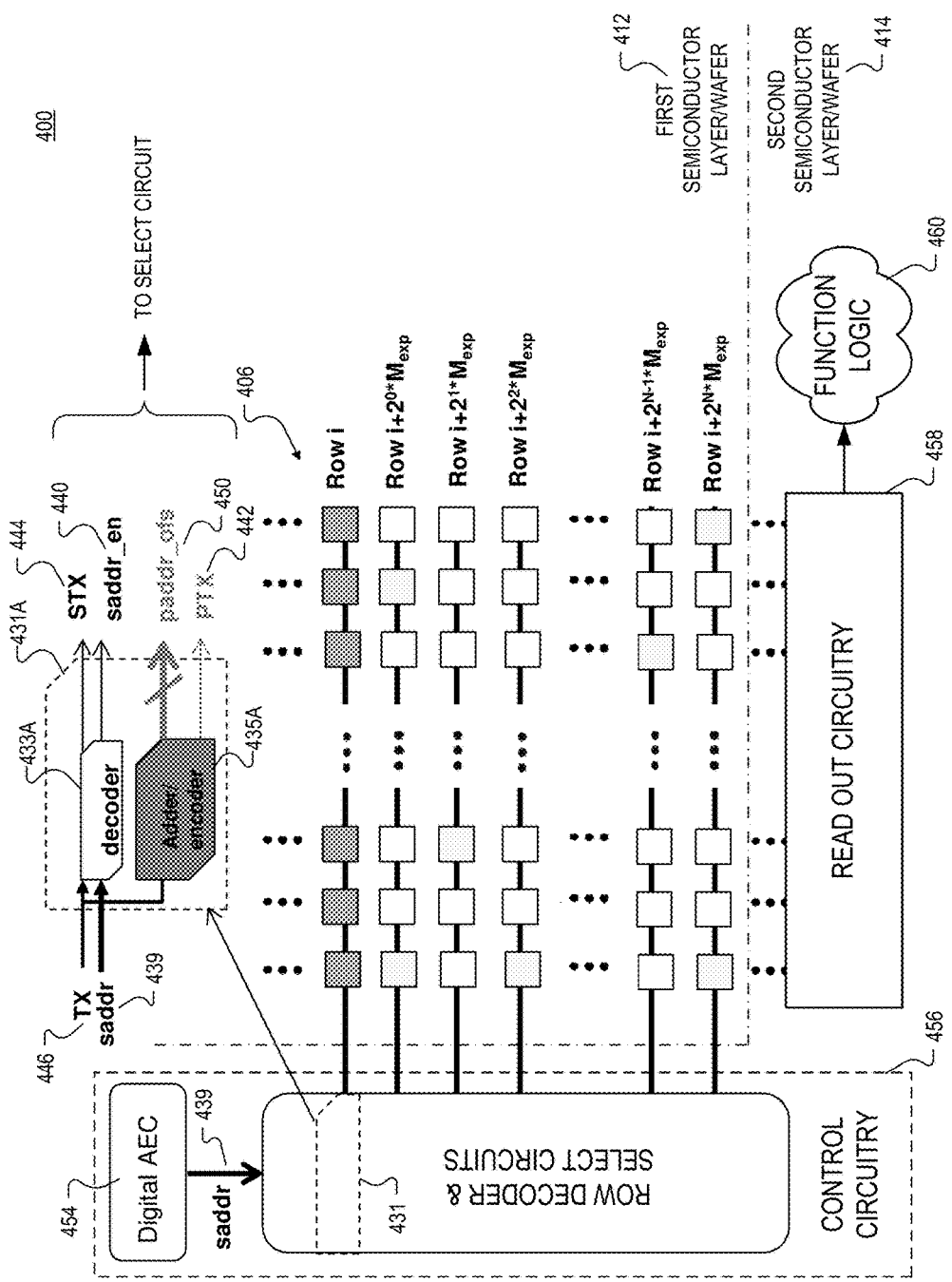
FIG. 4 is a block diagram illustrating an example imaging system including control circuitry with row decoder and select circuits coupled to a pixel array having a high dynamic range image sensor read out architecture using in-frame multi-bit exposure in accordance with the teachings of the present invention.

FIG. 4 is a block diagram illustrating an example imaging system 400 including control circuitry with row decoder and select circuits coupled to a pixel array 406 having a high dynamic range image sensor read out architecture using in-frame multi-bit exposure in accordance with the teachings of the present invention. In the illustrated example, it is appreciated that each of the pixel circuits included in pixel array 406 of FIG. 4 may be examples of the pixel circuits 110A, 110B, 110C of pixel array 106 of FIG. 1, or of pixel circuit 210 of FIG. 2, and that similarly named and numbered elements referenced below are coupled and function similar to as described above. As shown in the example depicted in FIG. 4, control circuitry 456 is coupled to the pixel array 406 to control the operation of the pixel array 406 including independently controlling an exposure time for each one of the pixel circuits in the pixel array 406 for a single frame in accordance with the teachings of the present invention. In the example, read out circuitry 458 is coupled to the pixel array 406 to read out image data from the plurality of pixel circuits of pixel array 406. In one example, the image data that is read out by read out circuitry 458 is transferred to function logic 460. In the depicted example, the pixel circuits of pixel array 406 are disposed in a first semiconductor layer 412, and the control circuitry 456, read out circuitry 458, and function logic 460 are disposed in second semiconductor layer 414. In the example, the first and second semiconductor layers 412 and 414 are stacked and coupled together in a stacked chip scheme.

In one example, read out circuitry 458 may include amplification circuitry, analog-to-digital (ADC) conversion circuitry or otherwise. Function logic 460 may simply store the image data or even manipulate the image data by applying post image effects (e.g., crop, rotate, remove red eye, adjust brightness, adjust contrast or otherwise). Pixel array 406 may be implemented as a front side illuminated image sensor or a back side illuminated image sensor. As illustrated, each pixel circuit is arranged into rows and columns in pixel array 406 to acquire image data of a person, place or object, which can then be used to render an image of the person, place or object.

As shown in the depicted example, the control circuitry 456 includes a digital automatic exposure control (AEC) 454 coupled to row decoder and select circuits 431. In one example, AEC 454 is coupled to read the image data from read out circuitry 458 to determine, based on the image data values of pixel circuits from a previous frame, any individual pixel circuits in pixel array 406 that may benefit from precharging, and therefore additional exposure time, in a subsequent frame to provide HDR imaging in accordance with the teachings of the present invention. As such, AEC 454 is coupled to provide the corresponding exposure values for the exposure memories EXPMEM (e.g., EXPMEM 252) in the select circuits as well as the corresponding sample address saddr 439 to the row decoder and select circuits 431 in accordance with the teachings of the present invention.

The example depicted in FIG. 4 illustrates a simplified example of row decoder circuitry 431A, which may be representative of one of a plurality of row decoder circuits included in the control circuitry 456. As shown in the depicted example, row decoder circuitry 431A includes a decoder circuit 433A that is coupled to receive a transmit TX source signal 446 and a sample address signal saddr 439 to generate the second transfer control signal STX 444 and a sample address enable signal saddr_en 440 as shown. Row decoder circuitry 431A also includes adder/encoder circuitry 435A, which in one example is also coupled to receive the transmit TX source signal 446, and is coupled to encode the precharge offset signal paddr_ofs 450 and generate the first transfer control signal PTX 442. As will be described in greater detail below, in one example, the adder circuitry of adder/encoder circuitry 435A is a +1 adder that includes a row input and a row output equal to the row input+1 (not shown in FIG. 4). In that example, the row input of the adder circuitry is coupled to receive a row output signal from the adder circuitry of a previous row of the pixel array 406, and the row output is coupled to generate a row output signal coupled to be received by the row input of the adder circuitry of the following row of the pixel array 406. In one example, the adder circuitry also includes an enable input that selectively increments the value received at the input. As shown in the depicted example, the first and second transfer control signals PTX 442 and STX 444, the sample address signal saddr 439, and the precharge offset signal paddr_ofs 450 are coupled to be received by a corresponding select circuit, such as for example select circuit 232 shown in FIG. 2.

In a rolling shutter design example of operation, assume that Row i of pixel array 406 is being read out. As such, the transfer transistors in the pixel circuits of Row i are coupled to receive the STX transfer control signal when the transfer transistors are activated during the read out operation while Row i is read out. In addition, Rows $i+2^{(0-N)}*M_{exp}$ may be coupled to be precharged, where N is an integer greater than or equal to zero, and $M_{exp}$ is an exposure factor. Thus, assuming for example that N=10 and the exposure factor $M_{exp}$=1, the N+1, or 11 other rows of the pixel array 406 that may be precharged and receive the PTX transfer control signal to provide additional exposure time for high dynamic range imaging are: Row $i+2^0*M_{exp}$, Row $i+2^1*M_{exp}$, Row $i+2^2*M_{exp}$, ..., Row $i+2^9*M_{exp}$, and Row $i+2^{10}*M_{exp}$ in accordance with the teachings of the present invention. In other words, if the row of the pixel array 406 that is being read out is Row i, the other rows of pixel array 406 that may be precharged while Row i is being read out with N=10, and exposure factor $M_{exp}$=1, are Rows i+1, i+2, i+4, i+512, and i+1024. The other rows of pixel array 406 are neither read out nor precharged at this time in accordance with the teachings of the present invention.

Figure 5:
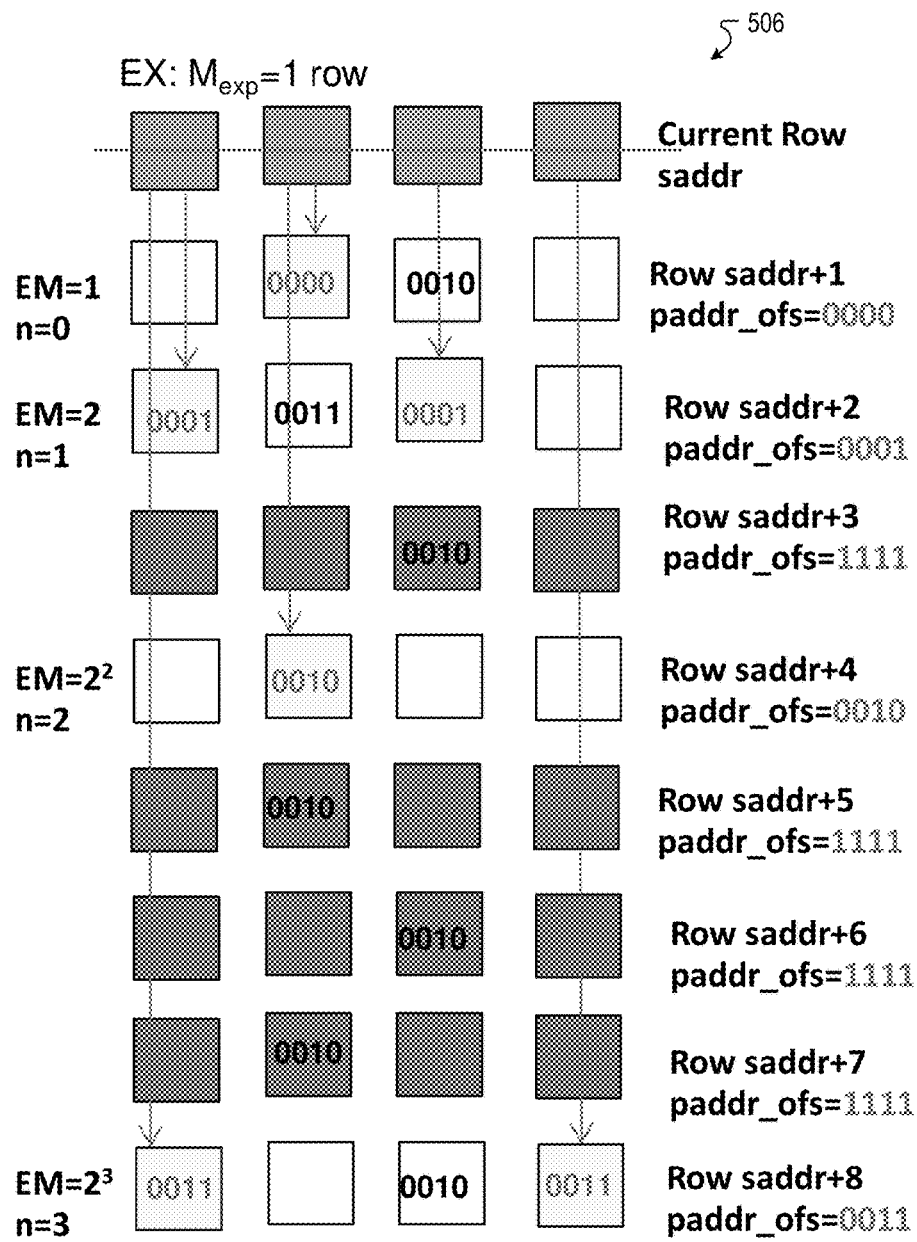
FIG. 5 is a block diagram illustrating the rows that are read out, that are precharged, and that are not precharged in an example imaging system including row decoder and select circuits with an exposure factor of 1 that is used with a high dynamic range image sensor read out architecture in accordance with the teachings of the present invention.

To better illustrate, FIG. 5 is a block diagram illustrating the rows that are read out, that are precharged, and that are not precharged in a pixel array 506 of an example imaging system including row decoder and select circuits with an exposure factor $M_{exp}$=1 that are used with a high dynamic range image sensor read out architecture in accordance with the teachings of the present invention. It is appreciated that pixel array 506 of FIG. 5 may be an example of pixel array 106 of FIG. 1, or of pixel circuit 406 of FIG. 4, and that similarly named and numbered elements referenced below are coupled and function similar to as described above.

In the example depicted in FIG. 5, it is assumed that the pixel array 506 is coupled to be read out with a rolling shutter design of operation with Row saddr of pixel array 506 being the current row that is being read out. As such, the transfer transistors included in the pixel circuits of Row saddr are coupled to receive the STX transfer control signal when the transfer transistors are activated during the read out operation of Row saddr.

In the depicted example, the exposure factor is $M_{exp}$=1. In addition, the exposure intensity EM (or exposure value) stored in the exposure memory EXPMEM for the row is the binary code n, which corresponds to an exposure step: EM=bin(n). As such, the binary code n for the exposure intensity EM stored in the exposure memory EXPMEM is set to n=0. Thus, EM is equal to $2^n=2^0=1$. Accordingly, the next row, Row saddr+$2^0$, or Row saddr+1, is precharged with the precharge offset signal set to paddr_ofs='0000' and the exposure step n=0 for an exposure intensity EM=$2^0$=1. Thus, the transfer transistors included in the pixel circuits of Row saddr+1 are coupled to receive the precharge PTX transfer control signal if the transfer transistors are to be activated to be precharged during the read out operation of Row saddr.

Similarly, the next row that is precharged is Row saddr+$2^1$, or Row saddr+2, with the binary code n=1, which corresponds to the exposure intensity EM=$2^1$ or EM=2, and the precharge offset signal set to paddr_ofs='0001'. As such, the transfer transistors included in the pixel circuits of Row saddr+2 are coupled to receive the precharge PTX transfer control signal if the transfer transistors are to be activated to be precharged during the read out operation of Row saddr.

However, the next row, Row saddr+3, is neither read out nor precharged, which is indicated with the precharge offset signal set to an invalid precharge offset signal value, such as paddr_ofs='1111'. As such, the transfer transistors included in the pixel circuits of Row saddr+3 are neither coupled to receive the precharge PTX transfer control signal nor the read out sample STX transfer control signal during the read out operation of Row saddr.

Instead, the next row that is precharged is Row saddr+$2^2$, or Row saddr+4, with the binary code n=2, which corresponds to the exposure intensity EM=$2^2$ or EM=4, and the precharge offset signal set to paddr_ofs='0010'. As such, the transfer transistors included in the pixel circuits of Row saddr+4 are coupled to receive the precharge PTX transfer control signal if the transfer transistors are to be activated to be precharged during the read out operation of Row saddr.

However, the next rows, Row saddr+5, Row saddr+6, and Row saddr+7 are neither read out nor precharged, which is indicated with the precharge offset signals for these rows set to the invalid precharge offset signal value, such as paddr_ofs='1111'. As such, the transfer transistors included in the pixel circuits of rows Row saddr+5, Row saddr+6, and Row saddr+7 are neither coupled to receive the precharge PTX transfer control signal nor the read out sample STX transfer control signal during the read out operation of Row saddr.

In the depicted example, the bottom row shown in FIG. 5 is coupled to be precharged. In the example, Row saddr+$2^3$, or Row saddr+8, is set with the binary code n=3, which corresponds to the exposure intensity EM=$2^3$ or EM=8, and the precharge offset signal set to paddr_ofs='0011'. As such, the transfer transistors included in the pixel circuits of Row saddr+8 are coupled to receive the precharge PTX transfer control signal if the transfer transistors are to be activated to be precharged during the read out operation of Row saddr.

Figure 6:
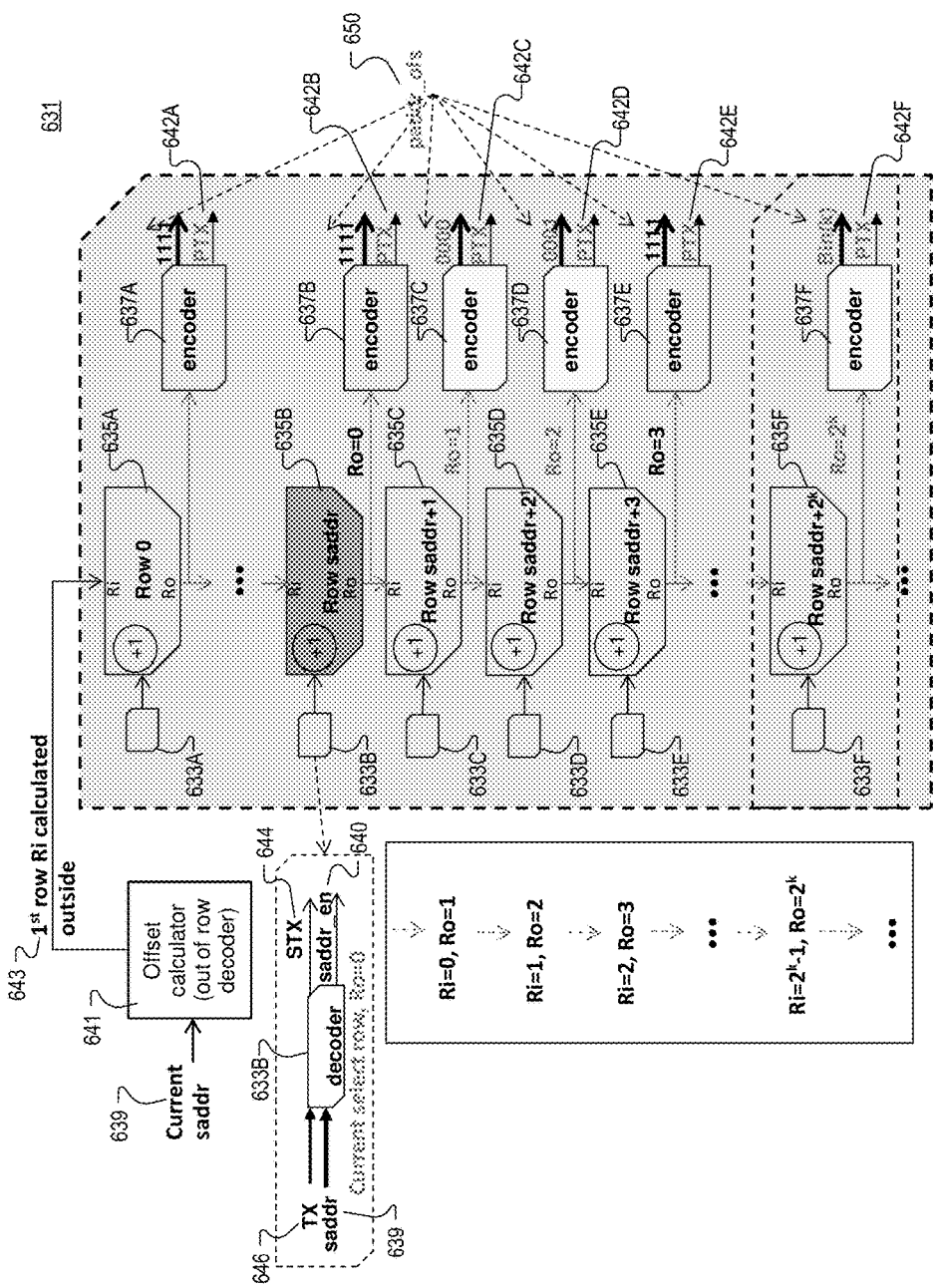
FIG. 6 is a block diagram illustrating an example row decoder circuit with an exposure factor of 1 that is used in an imaging system with a high dynamic range image sensor read out architecture using in-frame multi-bit exposure in accordance with the teachings of the present invention.

FIG. 6 is a block diagram illustrating a more detailed example of a row decoder circuit 631 with an exposure factor of $M_{exp}$=1 that is used in an imaging system with a high dynamic range image sensor read out architecture using in-frame multi-bit exposure in accordance with the teachings of the present invention. It is appreciated that row decoder circuit 631 of FIG. 6 may be an example of row decoder circuit 431A of FIG. 4, and that similarly named and numbered elements referenced below are coupled and function similar to as described above.

As shown in the depicted example, row decoder circuit 631 is arranged into a plurality of rows. Each row includes a decoder circuit 633A-F coupled to a corresponding adder circuit 635A-F coupled to a corresponding encoder circuit 637A-F. As shown in the example, each of the adder circuits 635A-F is a +1 adder circuit that includes a row input Ri and a row output Ro. In the example depicted in FIG. 6, each of the adder circuits 635A-F is coupled to increment the value received at its respective row input Ri, and output the corresponding sum at its respective row output Ro. The row output Ro of each adder circuit 635A-F is coupled to be received by the row input Ri of the corresponding adder circuit 635A-F of the next row of row decoder circuit 631. In addition, the row output Ro of each adder circuit 635A-F is also coupled to be received by the respective encoder circuit 637A-F of the same row of row decoder circuit 631. Furthermore, the first adder circuit 635A in row decoder circuit 631 is coupled to receive a 1st row Ri signal 643, which is calculated outside by an offset calculator 641, which is coupled to receive the current read out row as indicated with current saddr 639.

In addition, as will be shown in more detail below, the encoder circuits 637A-F of row decider circuit 631 are coupled to generate respective precharge offset signals paddr_ofs 650 that are representative of the difference between the respective row and the different row that is being currently read out, as indicated with saddr 639, for rows that may be precharged if the value represented by the row output Ro of the adder circuit is a power of 2. If on the other hand, the value represented by the row output Ro of the adder circuit is not a power of 2, then the row is not precharged and the encoder circuit is therefore coupled to generate a precharge offset signal paddr_ofs 650 to be representative of an invalid precharge row (e.g., '1111').

In the depicted example, the current row that is being read out by the pixel array that is coupled to row decoder circuit corresponds to decoder circuit 633B, adder circuit 635B, and adder circuit 637B. With the first adder circuit 635A coupled to receive a 1st row Ri signal 643 from offset calculator 641, the row output Ro value of adder circuit 635B adds up through the chain of intervening adder circuits from the first adder circuit 635A to be Ro=0, which indicates that that particular row of the pixel array is currently being read out. In addition, the corresponding decoder circuit 633B, which is coupled to receive a transfer TX source signal 646 and the current sample address signal saddr 639, is coupled to generate the sample control signal STX 644 and corresponding sample enable signal saddr_en 640 to read out the respective row of the pixel array. In addition, since the corresponding row coupled to decoder circuit 633B, adder circuit 635B, and encoder circuit 637B is being read out, and is therefore not being precharged, the encoder circuit 637B receiving the row output Ro value of adder circuit 635B of Ro=0 generates the invalid precharge offset signal 650 of paddr_ofs='1111' and the corresponding output for the precharge control signal PTX 642B to indicate no precharging for that row as shown.

However, as shown in FIG. 6, the adder circuit 635C of the next row receives the value of Ri=0, and therefore outputs a value of Ro=1, which is coupled to be received by encoder circuit 637C. As such, encoder circuit 637C outputs the corresponding precharge control signal PTX 642C and a valid precharge offset signal 650 of paddr_ofs='0000' to indicate precharging as shown.

Continuing with the example depicted in FIG. 6, the adder circuit 635D of the next row receives the value of Ri=1, and therefore outputs a value of Ro=2, which is coupled to be received by encoder circuit 637D. As such, encoder circuit 637D outputs the corresponding precharge control signal PTX 642D and a valid precharge offset signal 650 of paddr_ofs='0001' to indicate precharging for that row as shown.

However, the adder circuit 635E of the next row receives the value of Ri=2, and therefore outputs a value of Ro=3, which is coupled to be received by encoder circuit 637E. As such, encoder circuit 637E outputs the corresponding precharge control signal PTX 642E and an invalid precharge offset signal 650 of paddr_ofs='1111' to indicate no precharging as shown.

Continuing with the depicted example, the adder circuit 635F in bottom row illustrated in FIG. 6 is coupled to receive the value Ri=$2^k$-1, and therefore outputs a value of Ro=$2^k$. As such, encoder circuit 637F outputs the corresponding precharge control signal PTX 642F and a valid precharge offset signal 650 of paddr_ofs=Bin(k), where Bin(k) represents the binary value of k, to indicate precharging as shown. For example, if adder circuit 635F receives a signal Ri=7, then Ro=8, which corresponds to a power of 2, or $2^k$, where k=3. Thus, the precharge offset address paddr_ofs 650 is equal to Bin(k)=Bin(3), which equals '0011' in the depicted example in accordance with the teachings of the present invention.

Therefore, the +1 adder circuits 635A-F with the encoder circuits 637A-F are used to generated the precharge offset address 650 signals in row decoder circuit 631 in accordance with the teachings of the present invention. It is appreciated that this design of row decoder circuit 631 with the +1 adder circuits 635A-F with the encoder circuits 637A-F is independent of number of exposure steps in the pixel array. In addition, instead of having to use N+1 decoders for each exposure step, there is one adder circuit and encoder circuit whose area is independent of the number of exposure steps, which therefore enables a simplified design with few transistors, fewer metal connections, and therefore uses less overall area. Although there is a propagation delay in order for the chain of all of the adder circuit 635A-F to generate their respective row output Ro values, the row decoder circuit 631 may operate at the row frequency, which therefore provide almost a full row's time of several microsecond to compute the precharge offset address paddr_ofs 650 values, which is sufficient.

Figure 7:
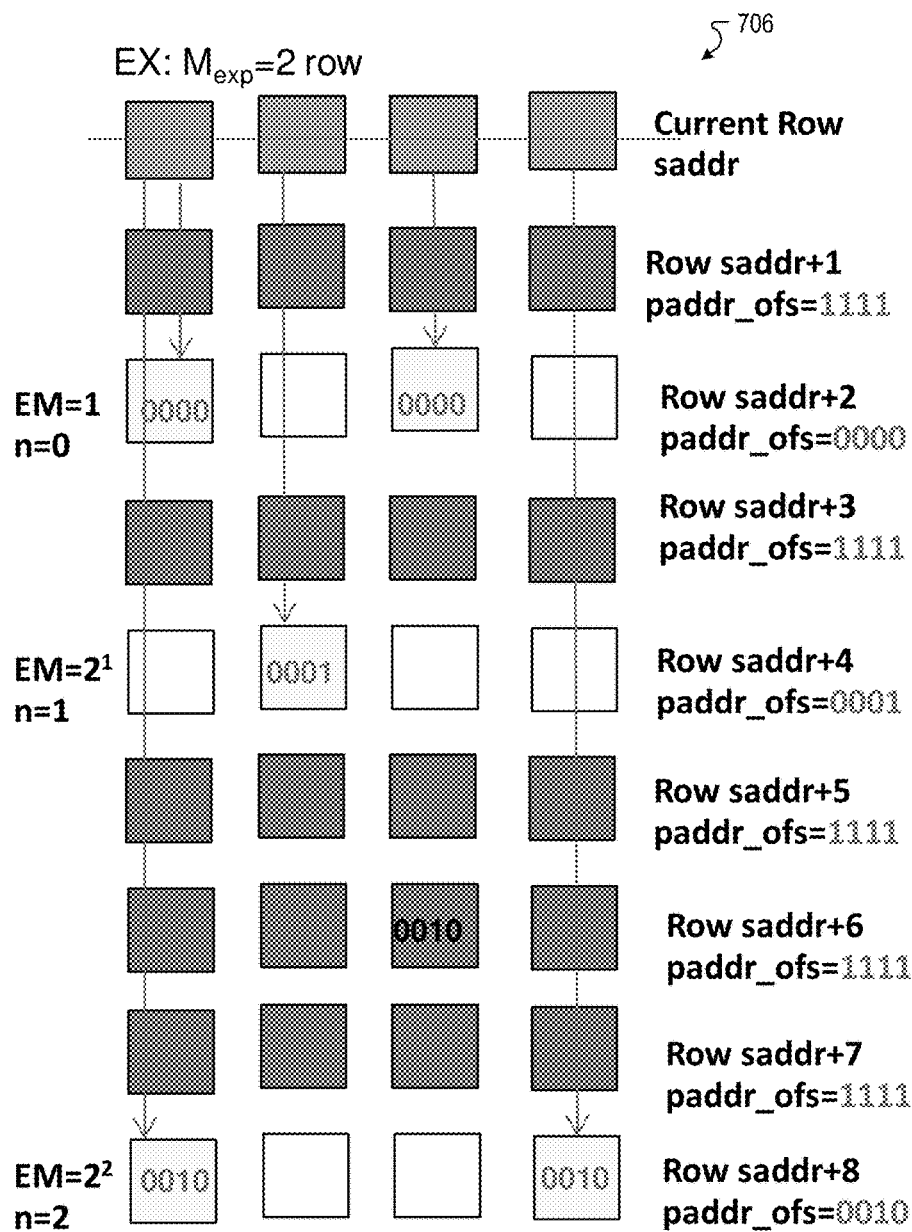
FIG. 7 is a block diagram illustrating the rows that are read out, that are precharged, and that are not precharged in another example of an imaging system including row decoder and select circuits with an exposure factor of 2 that is used with a high dynamic range image sensor read out architecture in accordance with the teachings of the present invention.

FIG. 7 is a block diagram another example, which illustrates the rows that are read out, that are precharged, and that are not precharged in another example of a pixel array 706 of an imaging system including row decoder and select circuits with an exposure factor $M_{exp}=2$ that is used with a high dynamic range image sensor read out architecture in accordance with the teachings of the present invention. It is appreciated that pixel array 706 of FIG. 5 may be an example of pixel array 106 of FIG. 1, or of pixel circuit 406 of FIG. 4, and that similarly named and numbered elements referenced below are coupled and function similar to as described above. In addition, although the exposure factor is $M_{exp}=2$ instead of $M_{exp}=1$, it is noted that the example depicted in FIG. 7 otherwise shares many similarities with the example illustrated in FIG. 5.

For instance, in the example depicted in FIG. 7, it is also assumed that the pixel array 706 is coupled to be read out with a rolling shutter design of operation with Row saddr of pixel array 706 being the current row that is being read out. As such, the transfer transistors included in the pixel circuits of Row saddr are coupled to receive the STX transfer control signal when the transfer transistors are activated during the read out operation of Row saddr.

In the depicted example, the rows of pixel array 706 that are: Row precharged are: Row saddr+$2^{(0-N)}*M_{exp}$, where N is representative of the number of possible exposure steps in the image sensor, and is an integer greater than or equal to zero. Thus, with the exposure factor $M_{exp}=2$, the rows that may be precharged are: Row saddr+$2^{(0)}*2$, Row saddr+$2^{(1)}*2$, Row saddr+$2^{(2)}*2$, Row saddr+$2^{(3)}*2$, ..., etc., which corresponds to Row saddr+2, Row saddr+4, Row saddr+8, Row saddr+16, ..., etc. Therefore, the first row to be precharged after the row that is read out (saddr) is Row saddr+2. Thus, the next row after the row that is being read out, which is Row saddr+1, is not precharged. Thus, the precharge offset value paddr_ofs for Row saddr+1 is set to the invalid offset value '1111'.

The first row that may be precharged with the exposure factor $M_{exp}=2$ is instead Row saddr+2. The binary code n for the exposure intensity EM stored in the exposure memory EXPMEM for Row saddr+2 is set to n=0. Thus, EM is equal to $2^n=2^0=1$. As such, the next row to be precharged is therefore Row saddr+$2^0*M_{exp}$, or Row saddr+2, and the precharge offset signal is set to paddr_ofs='0000'. Thus, the transfer transistors included in the pixel circuits of Row saddr+2 are coupled to receive the precharge PTX transfer control signal if the transfer transistors are to be activated to be precharged during the read out operation of Row saddr.

However, the next row, Row saddr+3, is neither read out nor precharged, which is indicated with the precharge offset signal set to the invalid precharge offset signal value, '1111'. As such, the transfer transistors included in the pixel circuits of Row saddr+3 are neither coupled to receive the precharge PTX transfer control signal nor the read out sample STX transfer control signal during the read out operation of Row saddr.

The next row that may be precharged is Row saddr+$2^1*M_{exp}$, or Row saddr+4, with the binary code n=1, which corresponds to the exposure intensity EM=$2^1$ or EM=2, and the precharge offset signal set to paddr_ofs='0001'. As such, the transfer transistors included in the pixel circuits of Row saddr+4 are coupled to receive the precharge PTX transfer control signal if the transfer transistors are to be activated to be precharged during the read out operation of Row saddr.

However, the next rows, Row saddr+5, Row saddr+6, and Row saddr+7 are neither read out nor precharged, which is indicated with the precharge offset signals for these rows set to the invalid precharge offset signal value paddr_ofs='1111'. As such, the transfer transistors included in the pixel circuits of rows Row saddr+5, Row saddr+6, and Row saddr+7 are neither coupled to receive the precharge PTX transfer control signal nor the read out sample STX transfer control signal during the read out operation of Row saddr.

The next row that is precharged is Row saddr+$2^2$, or Row saddr+4, with the binary code n=2, which corresponds to the exposure intensity EM=$2^2$ or EM=4, and the precharge offset signal set to paddr_ofs='0010'. As such, the transfer transistors included in the pixel circuits of Row saddr+4 are coupled to receive the precharge PTX transfer control signal if the transfer transistors are to be activated to be precharged during the read out operation of Row saddr.

Figure 8:
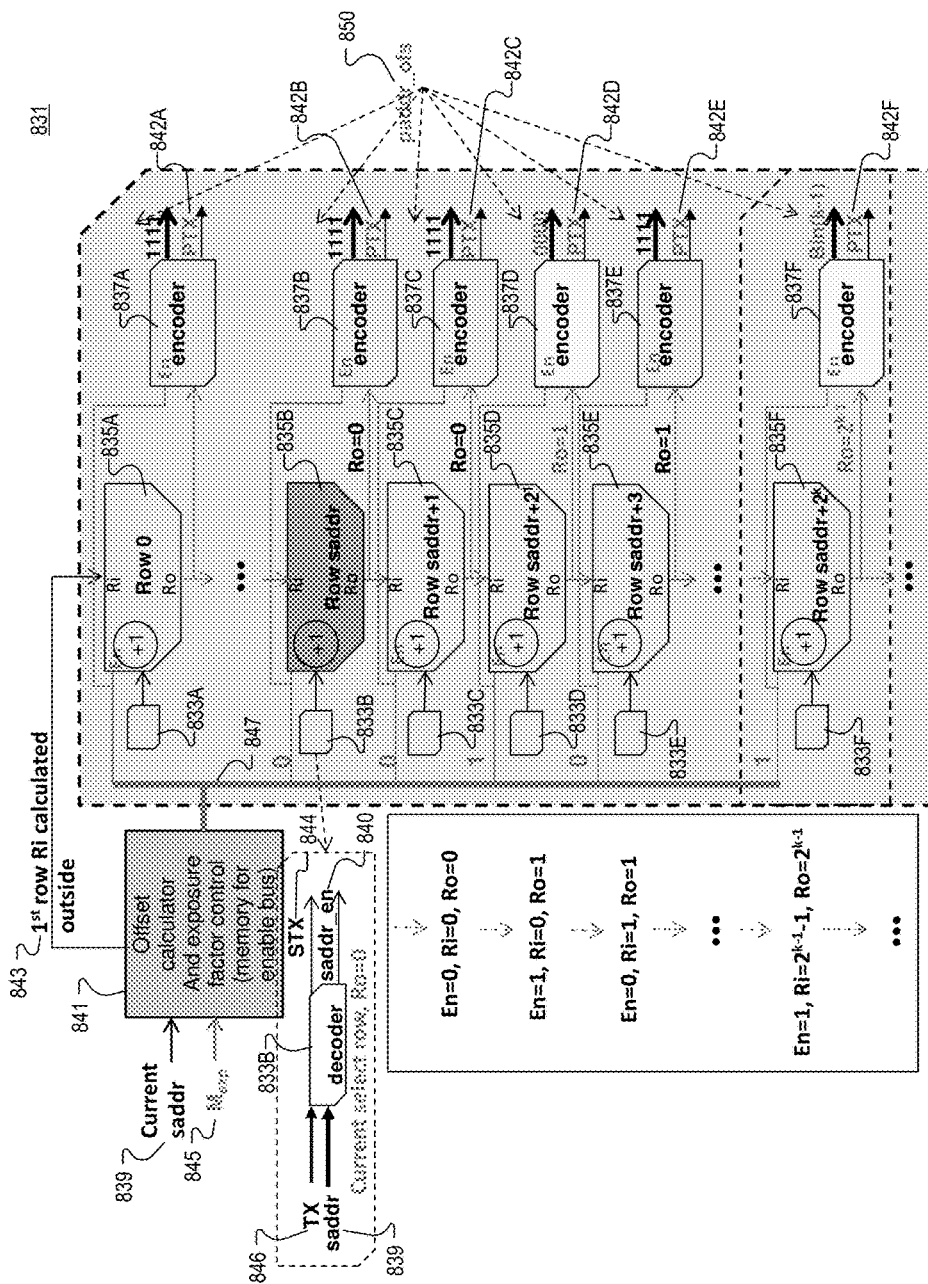
FIG. 8 is a block diagram illustrating another example of a row decoder circuit with an exposure factor of 2 that is used in an imaging system with a high dynamic range image sensor read out architecture using in-frame multi-bit exposure in accordance with the teachings of the present invention.

FIG. 8 is a block diagram illustrating a detailed example of a row decoder circuit 831 with an exposure factor of $M_{exp}=2$ that may be used in an imaging system with a high dynamic range image sensor read out architecture using in-frame multi-bit exposure in accordance with the teachings of the present invention. It is appreciated that row decoder circuit 831 of FIG. 8 may be another example of row decoder circuit 431A of FIG. 4, and that similarly named and numbered elements referenced below are coupled and function similar to as described above. In addition, although the exposure factor is $M_{exp}=2$ instead of $M_{exp}=1$, it is noted that the example depicted in FIG. 8 otherwise shares many similarities with the example illustrated in FIG. 6.

For instance, in the example depicted in FIG. 8, row decoder circuit 831 is arranged into a plurality of rows. Each row includes a decoder circuit 833A-F coupled to a corresponding adder circuit 835A-F coupled to a corresponding encoder circuit 837A-F. As shown in the example, each of the adder circuits 835A-F is a +1 adder circuit that includes a row input Ri and a row output Ro. In the example depicted in FIG. 8, each of the adder circuits 835A-F is coupled to increment the value received at its respective row input Ri, and output the corresponding sum at its respective row output Ro. The row output Ro of each adder circuit 835A-F is coupled to be received by the row input Ri of the corresponding adder circuit 835A-F of the next row of row decoder circuit 831. In addition, the row output Ro of each adder circuit 835A-F is also coupled to be received by the respective encoder circuit 837A-F of the same row of row decoder circuit 831. Furthermore, the first adder circuit 835A in row decoder circuit 831 is coupled to receive a 1st row Ri signal 843, which is calculated outside by an offset calculator 841. In the illustrated example, the offset calculator 841 is coupled to receive the current read out row, which is indicated with current saddr 839.

In contrast with offset calculator 641 of FIG. 6, the offset calculator 841 of FIG. 8 is coupled to receive the exposure factor signal $M_{exp}$ 845, and generate an enable bus 847. In the example, with the exposure factor $M_{exp}=2$, the enable bus signal 847 generates '0101010101010 ... " which indicates that every other row after the current row saddr may potentially be enabled for precharging. In an example in which the exposure factor $M_{exp}=3$, the enable bus signal 847 would generate '001001001001 ... " which indicates that every third row after the current row saddr may potentially be enabled for precharging. In an example in which the exposure factor $M_{exp}=4$, the enable bus signal 847 would generate '000100010001 ... " which indicates that every fourth row after the current row saddr may potentially be enabled for precharging, and so on.

As also shown, the adder circuits 835A-F and the encoder circuits 837A-F also include corresponding enable inputs En, which are coupled to receive the enable bus 847 from offset calculator 841 to enable or disable the respective adder circuits 835A-F and encoder circuits 837A-F. Thus, with the example of the exposure factor $M_{exp}=2$, and the enable bus signal 847 being '010101010 . . . ," every other row of adder circuits 835A-F and encoder circuits 837A-F after the row that is being read out (saddr) may be enabled or disabled for precharging in accordance with the teachings of the present invention. For example, and as will be described in greater detail below, for the row including adder circuit 835C and encoder 837C, which is disabled by the enable bus 847, En=0, Ri=0, Ro=0, and the paddr_ofs='1111'. For the row including adder circuit 835D and encoder 837D, which is enabled by the enable bus 847, En=1, Ri=0, Ro=1, and the paddr_ofs='0000'.

As mentioned, the encoder circuits 837A-F of row decider circuit 831 are coupled to generate respective precharge offset signals paddr_ofs 850 that are representative of the difference between the respective row and the different row that is being currently read out, which is indicated with saddr 839 for rows that may be precharged. For instance, in one example, the encoder circuits 837A-F determines an address offset Δofs, which is the total address difference between read out row (saddr) and the current row that may be precharged, and is then divided by the exposure factor $M_{exp}$. The $\Delta ofs/M_{exp}$ is then encoded into a 4-bit code to represent the precharge offset signal paddr_ofs 850 for rows that may be precharged. In particular, when the $\Delta ofs/M_{exp}$ is a power of 2, the output is $\log_2(\Delta ofs/M_{exp})$ converted to binary. In other words, if the binary logarithm of the address difference between read out row saddr and the current row to be precharged (i.e., $\log_2(\Delta ofs)$), divided by the exposure factor $M_{exp}$ is an integer k greater than or equal to zero, the precharge offset signal 850 is set to preaddr_ofs=Bin(k). However, when the binary logarithm of $\Delta ofs/M_{exp}$ (i.e., $\log_2(\Delta ofs/M_{exp})$) is not an integer value greater than or equal to zero, the output code of the precharge offset signal 850 is set to preaddr_ofs='1111', which is representative of the invalid precharge row.

To illustrate, if the Row being evaluated is saddr+2, and the exposure factor is $M_{exp}$=2, then the Δofs=2, and the quotient of $\Delta ofs/M_{exp}$=1.0. Since the $\log_2(1.0)$ is an integer value k (i.e., k=0), then the row saddr+2 may be precharged, and the precharge offset signal 850 is set to paddr_ofs=Bin(k)='0000'. However, if the current row is saddr, the Row being evaluated is saddr+3, and the exposure factor is $M_{exp}$=2, then the Δofs=3, and the quotient of $\Delta ofs/M_{exp}$=1.5. Since the $\log_2(1.5)$ is not an integer value greater than or equal zero (i.e., since 1.5 is not a power of 2), then the row saddr+3 is not precharged, and the precharge offset signal 850 is therefore set to paddr_ofs='1111'.

Continuing with the example depicted in FIG. 8, the current row that is being read out is the row coupled to decoder circuit 833B, adder circuit 835B, and adder circuit 837B. With the first adder circuit 835A coupled to receive a 1st row Ri signal 843 from offset calculator 841, the row output Ro value of adder circuit 835B adds up through the chain of intervening adder circuits from the first adder circuit 835A to be Ro=0, which indicates that that particular row of the pixel array is currently being read out. In addition, the corresponding decoder circuit 833B, which is coupled to receive a transfer TX source signal 846 and the current sample address signal saddr 839, is coupled to generate the sample control signal STX 844 and corresponding sample enable signal saddr_en 840 to read out the respective row of the pixel array. In addition, since the corresponding row coupled to decoder circuit 833B, adder circuit 835B, and encoder circuit 837B is being read out, and is therefore not being precharged, the encoder circuit 837B receiving the row output Ro value of adder circuit 635B of Ro=0 generates the invalid precharge offset signal 850 of paddr_ofs='1111' and the corresponding output for the precharge control signal PTX 842B to indicate no precharging for that row as shown. Furthermore, it is appreciated that the respect enable terminals En of adder circuit 835B and encoder circuit 837B are coupled to receive the '0' value from the enable bus 847 as shown, which also indicates that the row is not to be precharged, which also results in the invalid precharge offset signal 850 of paddr_ofs='1111' and the corresponding output for the precharge control signal PTX 842B to indicate no precharging for that row.

Similarly, as shown in FIG. 8, the adder circuit 835C of the next row also receives an enable signal of En=0 and Ri=0, and therefore outputs a value of Ro=0, which is coupled to be received by encoder circuit 837C, which also receives the enable signal of En=0. As such, encoder circuit 837C also outputs the invalid precharge offset signal 850 of paddr_ofs='1111' and the corresponding output for the precharge control signal PTX 842C to indicate no precharging for that row.

However, as already summarized above, the adder circuit 835D of the next row receives an enable signal of En=1 and Ri=0, and therefore outputs a value of Ro=1, which is coupled to be received by encoder circuit 837D, which also receives the enable signal of En=1. As such, encoder circuit 837D also outputs the valid precharge offset signal 850 of paddr_ofs='0000' (i.e., $\log_2(1.0)$ converted to binary) and the corresponding output for the precharge control signal PTX 842D to indicate precharging for that row.

Continuing with the depicted example, the adder circuit 835F in bottom row illustrated in FIG. 8 is coupled to receive an enable signal of En=1 and Ri=$2^{k-1}$−1, and therefore outputs a value of Ro=$2^{k-1}$, which is coupled to be received by encoder circuit 837F, which also receives the enable signal of En=1. As such, encoder circuit 837F also outputs the valid precharge offset signal 850 of paddr_ofs=Bin(k−1) (i.e., $\log_2(k-1)$ converted to binary) and the corresponding output for the precharge control signal PTX 842F to indicate precharging for that row.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A pixel circuit, comprising:
   a photodiode adapted to accumulate image charge in response to incident light;
   a transfer transistor coupled between the photodiode and a floating diffusion disposed in the first semiconductor layer to selectively transfer the image charge accumulated in the photodiode to the floating diffusion; and
   a selection circuit coupled to receive a sample enable signal and a precharge offset signal, wherein the precharge offset signal is representative of a difference between a row in which the transfer transistor is included and a different row that is being read out, wherein the selection circuit is further coupled to a control terminal of the transfer transistor to select between first and second transfer control signals to control the transfer transistor, wherein the selection circuit is coupled to output the first transfer control signal in response to a precharge enable signal during a read out operation of the different row that is being read out, wherein the precharge enable signal is generated in response to a comparison of the precharge offset signal and an exposure value signal, and wherein the selection circuit is coupled to output the second transfer control signal in response to the sample enable signal during a read out operation of the row in which the transfer transistor is included.

2. The pixel circuit of claim 1, wherein the pixel circuit is one of a plurality of pixel circuits included in a pixel array arranged into a plurality of rows and a plurality of columns.

3. The pixel circuit of claim 1, wherein the selection circuit includes:
a first switch coupled to generate the first transfer control signal in response to the precharge enable signal;
a second switch coupled to generate the second transfer control signal in response to the sample enable signal;
a comparison circuit coupled to compare the precharge offset signal and the exposure value signal to generate the precharge enable signal; and
an exposure memory coupled to store the exposure value signal.

4. The pixel circuit of claim 3, wherein the comparison circuit comprises:
a plurality of exclusive-OR (XOR) gates, wherein each one of the plurality of XOR gates is coupled to receive a corresponding bit of the precharge offset signal and a corresponding bit of the exposure value signal; and
a NAND gate coupled to outputs of the plurality of XOR gates, wherein an output of the NAND gate is coupled to generate the precharge enable signal.

5. The pixel circuit of claim 4, further comprising an automatic exposure control circuit coupled to generate the different possible exposure values for the exposure value signal stored by the exposure memory.

6. The pixel circuit of claim 1, further comprising row decoder circuitry coupled to generate the sample enable signal and the precharge enable signal in response to a sample address signal, wherein the sample address signal is representative of a current row that is to undergo the read out operation.

7. The pixel circuit of claim 6, wherein the row decoder circuitry comprises:
a decoder circuit coupled to receive a transmit source signal and the sample address signal, wherein the decoder circuit is coupled to output the sample enable signal and the second transfer control signal in response to whether the current row that is to undergo the read out operation is the row in which the transfer transistor is included;
an adder circuit having a row input and a row output, wherein the adder circuit is coupled to increment the row input to generate the row output, wherein the row input of the adder circuit is coupled to a row output of previous adder circuit of a previous row, and wherein the row output is coupled to a row input of a next adder circuit of a next row; and an encoder circuit coupled to generate the precharge offset signal and the first control signal in response to the row output of the adder circuit.

8. The pixel circuit of claim 7, further comprising an offset calculator coupled to receive the sample address signal to generate a first row value coupled to be received by a row input of a first adder circuit in a first row.

9. The pixel circuit of claim 8, wherein the encoder circuit is coupled to generate the precharge offset signal to be representative of the difference between the row in which the transfer transistor is included and the different row that is being read out a value represented by the row output of the adder circuit is a power of 2, and wherein the encoder circuit is coupled to generate precharge offset signal to be representative of an invalid precharge row value if the value represented by the row output of the adder circuit is not a power of 2.

10. The pixel circuit of claim 8, wherein the offset calculator is further coupled to receive an exposure factor signal, wherein the offset calculator is further coupled to generate an enable signal in response to the exposure factor signal.

11. The pixel circuit of claim 10, wherein adder circuit is further coupled to receive the enable signal from the offset calculator, wherein the adder circuit is coupled to conditionally increment the row input to generate the row output in response to the enable signal, or whether the adder circuit is coupled to pass the row input to the row output in response to the enable signal.

12. The pixel circuit of claim 11, wherein the encoder circuit is coupled to generate the precharge offset signal to be representative of a binary logarithm of a total of the difference between the row in which the transfer transistor is included and the different row that is being read out divided by a value represented by the exposure factor signal if the total of the difference between the row in which the transfer transistor is included and the different row that is being read out divided by the value represented by the exposure factor signal is a power of 2, and wherein the encoder circuit is coupled to generate the precharge offset signal to be representative of an invalid precharge row value if the total of the difference between the row in which the transfer transistor is included and the different row that is being read out divided by the value represented by the exposure factor signal is not a power of 2.

13. The pixel circuit of claim 11, wherein the encoder circuit is further coupled to receive the enable signal, wherein the encoder circuit is coupled to generate the precharge offset signal to be representative of an invalid precharge row value if the enable signal indicates that the encoder circuit is not enabled.

14. The pixel circuit of claim 1, wherein the first control signal is a precharge transfer control signal, and wherein second control signal is a sample transfer control signal.

15. The pixel circuit of claim 1, wherein the photodiode, the transfer transistor, and the floating diffusion are disposed in a first semiconductor layer, and wherein the selection circuit is disposed in a second semiconductor layer and is coupled to the control terminal of the transfer transistor through a hybrid bond between the first and second semiconductor layers.

16. The pixel circuit of claim 15, further comprising:
a reset transistor disposed in the first semiconductor layer and coupled to the floating diffusion to selectively reset the floating diffusion;

an amplifier transistor disposed in the first semiconductor layer and having an amplifier gate coupled to the floating diffusion; and a row select transistor disposed in the first semiconductor layer coupled between a bitline and the amplifier transistor.

17. The pixel circuit of claim 15, wherein the first and second semiconductor layers are stacked and coupled together in a stacked chip scheme.

18. An imaging system, comprising:

a pixel array having a plurality of pixel circuits arranged into a plurality of rows and a plurality of columns, wherein each one of the pixel circuits includes:

a photodiode adapted to accumulate image charge in response to incident light;

a transfer transistor coupled between the photodiode and a floating diffusion disposed in the first semiconductor layer to selectively transfer the image charge accumulated in the photodiode to the floating diffusion; and a selection circuit coupled to receive a sample enable signal and a precharge offset signal, wherein the precharge offset signal is representative of a difference between a row in which the transfer transistor is included and a different row that is being read out, wherein the selection circuit is further coupled to a control terminal of the transfer transistor to select between first and second transfer control signals to control the transfer transistor, wherein the selection circuit is coupled to output the first transfer control signal in response to a precharge enable signal during a read out operation of the different row that is being read out, wherein the precharge enable signal is generated in response to a comparison of the precharge offset signal and an exposure value signal, and wherein the selection circuit is coupled to output the second transfer control signal in response to the sample enable signal during a read out operation of the row in which the transfer transistor is included;

control circuitry coupled to the pixel array to control operation of the pixel array, wherein the selection circuit is included in the control circuitry; and read out circuitry coupled to the pixel array to read out image data from the plurality of pixel circuits.

19. The imaging system of claim 18, further comprising function logic coupled to the read out circuitry to store the image data read out from the plurality of pixel circuits.

20. The imaging system of claim 18, wherein the selection circuit includes:

a first switch coupled to generate the first transfer control signal in response to the precharge enable signal;

a second switch coupled to generate the second transfer control signal in response to the sample enable signal;

a comparison circuit coupled to compare the precharge offset signal and the exposure value signal to generate the precharge enable signal; and an exposure memory coupled to store the exposure value signal.

21. The imaging system of claim 20, wherein the comparison circuit comprises:

a plurality of exclusive-OR (XOR) gates, wherein each one of the plurality of XOR gates is coupled to receive a corresponding bit of the precharge offset signal and a corresponding bit of the exposure value signal; and a NAND gate coupled to outputs of the plurality of XOR gates, wherein an output of the NAND gate is coupled to generate the precharge enable signal.

22. The imaging system of claim 20, wherein the control circuitry further comprises an automatic exposure control circuit coupled to generate different possible exposure values that can be stored by the exposure memory.

23. The imaging system of claim 18, wherein the control circuitry further comprises row decoder circuitry coupled to generate the sample enable signal and the precharge enable signal in response to a sample address signal, wherein the sample address signal is representative of a current row that is to undergo the read out operation.

24. The imaging system of claim 23, wherein the row decoder circuitry comprises:

a decoder circuit coupled to receive a transmit voltage signal and the sample address signal, wherein the decoder circuit is coupled to output the sample enable signal and the second transfer control signal in response to whether the current row that is to undergo the read out operation is the row in which the transfer transistor is included;

an adder circuit having a row input and a row output, wherein the adder circuit is coupled to increment the row input to generate the row output, wherein the row input of the adder circuit is coupled to a row output of previous adder circuit of a previous row, and wherein the row output is coupled to a row input of a next adder circuit of a next row; and an encoder circuit coupled to generate the precharge offset signal and the first control signal in response to the row output of the adder circuit.

25. The imaging system of claim 24, wherein the control circuitry further comprises an offset calculator coupled to receive the sample address signal to generate a first row value coupled to be received by a row input of a first adder circuit in a first row.

26. The imaging system of claim 25, wherein the encoder circuit is coupled to generate the precharge offset signal to be representative of the difference between the row in which the transfer transistor is included and the different row that is being read out if a binary logarithm of a value represented by the row output of the adder circuit is a power of 2, and wherein the encoder circuit is coupled to generate precharge offset signal to be representative of an invalid precharge row value if the binary logarithm of the value represented by the row output of the adder circuit is not a power of 2.

27. The imaging system of claim 25, wherein the offset calculator is further coupled to receive an exposure factor signal, wherein the offset calculator is further coupled to generate an enable signal in response to the exposure factor signal.

28. The imaging system of claim 27, wherein adder circuit is further coupled to receive the enable signal from the offset calculator, wherein the adder circuit is coupled to conditionally increment the row input to generate the row output in response to the enable signal, or whether the adder circuit is coupled to pass the row input to the row output in response to the enable signal.

29. The imaging system of claim 28, wherein the encoder circuit is coupled to generate the precharge offset signal to be representative of a binary logarithm of a total of the difference between the row in which the transfer transistor is included and the different row that is being read out divided by a value represented by the exposure factor signal if the total of the difference between the row in which the transfer transistor is included and the different row that is being read out divided by the value represented by the exposure factor signal is a power of 2, and wherein the encoder circuit is coupled to generate the precharge offset signal to be representative of an invalid precharge row value if the total of the difference between the row in which the transfer transistor is included and the different row that is being read out divided by the value represented by the exposure factor signal is not a power of 2.

30. The imaging system of claim 28, wherein the encoder circuit is further coupled to receive the enable signal, wherein the encoder circuit is coupled to generate the precharge offset signal to be representative of an invalid precharge row value if the enable signal indicates that the encoder circuit is not enabled.

31. The imaging system of claim 18, wherein the first control signal is a precharge transfer control signal, and wherein second control signal is a sample transfer control signal.

32. The imaging system of claim 28, wherein the photodiode, the transfer transistor, and the floating diffusion are disposed in a first semiconductor layer, and wherein the selection circuit is disposed in a second semiconductor layer and is coupled to the control terminal of the transfer transistor through a hybrid bond between the first and second semiconductor layers.

33. The imaging system of claim 32, wherein each one of the pixel circuits further includes:
- a reset transistor disposed in the first semiconductor layer and coupled to the floating diffusion to selectively reset the floating diffusion;
- an amplifier transistor disposed in the first semiconductor layer and having an amplifier gate coupled to the floating diffusion; and
- a row select transistor disposed in the first semiconductor layer coupled between a bitline and the amplifier transistor.

34. The imaging system of claim 32, wherein the first and second semiconductor layers are stacked and coupled together in a stacked chip scheme.

* * * * *